United States Patent Office 3,452,018
Patented June 24, 1969

3,452,018
1 - [2 - SUBSTITUTED - 6 - ARYLSULFONAMIDO-PYRIMIDIN - 4 - YL]PYRIDINIUM HYDROXIDE INNER SALTS
Arthur A. Santilli, Havertown, and Dong H. Kim, Strafford, Pa., assignors to American Home Products Corporation, New York, N.Y., a corporation of Delaware
No Drawing. Filed Aug. 29, 1966, Ser. No. 575,524
Int. Cl. C07d 51/44; A61k 27/00
U.S. Cl. 260—256.5                    10 Claims

ABSTRACT OF THE DISCLOSURE

The invention is directed to a method of producing, and to the resultant product, 1-[2-substituted-6-aryl-sulfonamidopyrimidin-4-yl]pyridinium hydroxide inner salts by the reaction of a substituted 4-amino-6-chloropyrimidine with a substituted pyridine and substituted sulfonyl chloride. The products are useful as hypotensive agents.

---

This invention relates to new and novel inner salts as well as to the novel method for their preparation. In particular, the present invention is concerned with 1-[2-substituted - 6-arylsulfonamidopyrimidin-4-yl]pyridinium hydroxide, inner salts having therapeutic activity.

The novel compounds which are included within the scope of this invention are selected from the group having the general formula:

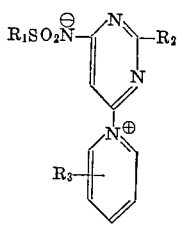

wherein $R_1$ is selected from the group consisting of phenyl, halophenyl and lower alkylphenyl; $R_2$ is lower alkyl, lower thioalkyl, phenyl, lower alkylphenyl, halophenyl and lower alkoxyphenyl; and $R_3$ is selected from the group consisting of hydrogen and lower alkyl. As used herein, the terms "lower alkyl," "lower alkoxy," "lower thioalkyl" and the like describe groups containing from one to about four carbon atoms. Examples thereof are:

1 - [2 - phenyl - 6-(4-tolylsulfonamido)pyrimidin-4-yl]pyridinum hydroxide, inner salt;
1 - [2 - methylthio - 6 - (4-tolysulfonamido)pyrimidin-4-yl]pyridinium hydroxide, inner salt;
1 - [6 - (4 - chlorophenylsulfonamido) - 2 - phenylpyrimidin-4-yl]pyridinium hydroxide, inner salt;
1 - [6 - phenylsulfonamido - 2 - phenylpyrimidin-4-yl]pyridinium hydroxide, inner salt;
1 - [2 - methyl - 6 - (4 - tolylsulfonamido)pyrimidin-4-yl]-pyridinium hydroxide, inner salt; and
2- methyl - 1 - [2 - phenyl-6-(3-tolylsulfonamido)pyrimidin-4-yl]pyridinium hydroxide, inner salt.

In accord with the process of the present invention, the above mentioned pyridinium hydroxide, inner salts may be prepared by the reaction of a 4-amino-6-chloropyrimidine of the formula:

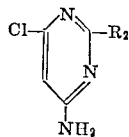

wherein $R_2$ is defined as above, with a pyridine of the formula:

wherein $R_3$ has the same meaning as previously set forth, and a sulfonyl chloride of the formula:

$$R_1SO_2Cl$$

wherein $R_1$ is defined as above. The reaction is effected by heating a mixture containing substantially equimolar amounts of a 4-amino-6-chloropyrimidine and sulfonyl chloride and an excess amount of a pyridine at about reflux temperatures for a period of from about one to about four hours. After the reaction is complete, the reaction mixture is cooled and the product separated by conventional methods, such as, filtration and recrystallization from a suitable solvent, e.g. water, dimethylformamide and dimethylacetamide.

Many of the reactants employed in the process of this invention are known compounds which are readily available from commercial sources while the remainder can easily be prepared in accord with standard procedures well known to those skilled in the art.

In accord with the present invention, the new pyridinium hydroxide, inner salts herein described have been found to possess interesting pharmaceutical properties which render them useful as synthetic medicinals. More particularly, these compounds, in standard pharmacological tests, have exhibited utility as hypotensive agents.

When the compounds of this invention are employed as hypotensive agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for examples, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 50 mg. to about 200 mg. per day, although as aforementioned variations will occur. However, a dosage level that is in the range of from about 100 mg. to about 150 mg. per day is most desirably employed in order to achieve effective results.

The following examples are given by way of illustration and are not be construed as limitations of this invention, variations of which are possible without departing from the scope and spirit thereof.

EXAMPLE I

To a solution of 10.3 g. of 4-amino-6-chloro-2-phenylpyrimidine in 35 ml. of pyridine is added 9.9 g. of 4-toluenesulfonyl chloride. The reaction mixture is heated under reflux for one hour and forty minutes, and cooled to room temperature. The reaction mixture is filtered under suction yielding 8.5 g. of a solid. Recrystallization of this material from N,N-dimethylformamide gives 3.6 g. of 1-[2-phenyl-6-(4-tolylsulfonamido)pyrimidin-4-yl] pyridinium hydroxide, inner salt, M.P. 304–306° C.

*Analysis.*—Calc'd for $C_{22}H_{18}N_4O_2S$: C, 65.65; H, 4.51; N, 13.92; S, 7.95. Found: C, 65.59; H, 4.14; N, 13.93; S, 7.9.

EXAMPLE II

To a solution of 20.0 g. of 4-amino-6-chloro-2-phenylpyrimidine in 70 ml. of α-picoline is added 20.0 g. of 3-toluenesulfonyl chloride. The reaction mixture is heated under reflux for two hours and cooled. The reaction mixture is filtered under suction and the collected solid recrystallized from N,N-dimethylacetamide to afford 2-methyl - 1 - [2-phenyl-6-(3-tolylsulfonamido)pyrimidin-4-yl] pyridinium hydroxide, inner salt.

In a similar manner, the interaction of β-picoline, 4-chlorophenylsulfonyl chloride and 4-amino-6-chloro-2-(4-tolyl)pyrimidine affords 1-[6-(4-chlorophenylsulfonamido)-2-(4-tolyl)pyrimidin-4-yl] - 3 - methylpyridinium hydroxide, inner salt.

EXAMPLE III

To a solution of 5.0 g. of 4-amino-6-chloro-2-(4-chlorophenyl)pyrimidine in 20 ml. of pyridine is added 5.0 g. of benzenesulfonyl chloride. The reaction mixture is heated under reflux for four hours and cooled to room temperature. The reaction mixture is filtered and the solid recrystallized from water to afford 1-[2-(4-chlorophenyl)6-phenylsulfonamidopyrimidin-4-yl]pyridinium hydroxide, inner salt.

In a similar manner, by the interaction of 4-amino-6-chloro-2-(4-iodophenyl)pyrimidine, pyridine and 4-ethylphenylsulfonyl chloride there is obtained 1-[6-(4-ethylphenylsulfonamido) - 2 - (4 - iodophenyl)pyrimidin-4-yl] pyridinium hydroxide, inner salt.

EXAMPLE IV

Repeating the procedure of the previous examples to react the hereinafter listed 4-amino-6-chloropyrimidines, pyrimidines, pyridines and phenylsulfonyl chlorides, the following pyridinium hydroxide, inner salts are obtained:

| Starting materials | Product |
| --- | --- |
| 4-amino-6-chloro-2-(3-ethylphenyl)pyrimidine, pyridine and 4-bromophenylsulfonyl chlride. | 1-[6-(4-bromophenylsulfonamido)-2-(3-ethylphenyl)pyrimidin-4-yl]pyridinium hydroxide, inner salt. |
| 4-amino-6-chloro-2-(4-methoxyphenyl)pyrimidine, γ-picoline and benzenesulfonyl chloride. | 1-[2-(4-methoxyphenyl)-6-phenylsulfonamidopyrimidin-4-yl]-4-methylpyridinium hydroxide, inner salt. |
| 4-amino-2-(4-bromophenyl)-6-chloropyrimidine, pyridine and 4-toluenesulfonyl chloride. | 1-[2-(4-bromophenyl)-6-(4-tolylsulfonamido)pyrimidin-4-yl]pyridinium hydroxide, inner salt. |
| 4-amino-6-chloro-2-(3-fluorophenyl)pyrimidine, α-picoline and 4-iodophenylsulfonyl chloride. | 1-[2-(3-fluorophenyl)-6-(4-iodophenylsulfonamido)pyrimidin-4-yl]-2-methylpyridinium hydroxide, inner salt. |
| 4-amino-2-(4-ethoxyphenyl)-6-chloropyrimidine, pyridine and benzenesulfonyl chloride. | 1-[2-(4-ethoxyphenyl)-6-phenylsulfonamidopyrimidin-4-yl]pyridinium hydroxide, inner salt. |
| 4-amino-2-(4-butylphenyl)-6-chloropyrimidine, 4-ethylpyridine and 4-chlorophenylsulfonyl chloride. | 1-(2-(4-butylphenyl)-6-(4-chlorophenylsulfonamido)pyrimidin-4-yl]-4-ethylpyridinium hydroxide, inner salt. |
| 4-amino-2-(4-butoxyphenyl)-6-chloropyrimidine, pyridine and benzenesulfonyl chloride. | 1-[2-(4-butoxyphenyl)-6-phenylsulfonamidopyrimidin-4-yl]pyridinium hydroxide, inner salt. |

EXAMPLE V

To a solution of 5.8 g. of 4-amino-6-chloro-2-phenylpyrimidine in 30 ml. of dry pyridine is added 6.0 g. of 4-chlorobenzenesulfonyl chloride. The reaction mixture is heated under reflux with stirring for two and a half hours, cooled in ice and added to 500 ml. of water. Filtration affords 5.5 g. of product, M.P. 259–263° C. Recrystallization from N,N-dimethylformamide yields 2.8 g. of 1-[6-(4 - chlorophenylsulfonamido) - 2 - phenylpyrimidin - 4-yl]pyridinium hydroxide, inner salt, M.P. 294–295° C.

*Analysis.*—Calc'd for $C_{21}H_{15}ClN_4O_2S$: C, 59.64; H, 3.58; N, 13.25; Cl, 8.38; S, 7.58. Found: C, 59.37; H, 3.71; N, 12.95; Cl, 8.5; S, 7.6.

By repeating the above reaction, but substituting 4-butylpyridine for pyridine, there is obtained 4-butyl-1-[6-(4-chlorophenylsulfonamido)-2-phenylpyrimidin - 4 - yl] pyridinium hydroxide, inner salt.

EXAMPLE VI

To a solution of 6.0 g. of 4-amino-6-chloro-2-phenylpyrimidine in 30 ml. of dry pyridine is added 6.0 g. of benzenesulfonyl chloride. The reaction mixture is heated under reflux with stirring for one hour and forty minutes. The excess pyridine is then removed by evaporation in a rotary evaporator in vacuo and the residue washed with 100 ml. of water followed by washing with ether (2× 150 ml.). The crude product amounted to 4.4 g., M.P. 218–224° C. Recrystallization from aqueous N,N-dimethylformamide affords 1-[6-phenylsulfonamido-2-phenylpyrimidin-4-yl]pyridinium hydroxide, inner salt, M.P. 294–295° C.

*Analysis.*—Calc'd for $C_{21}H_{16}N_4O_2S$: C, 64.93; H, 4.15; N, 14.42; S, 8.26. Found: C, 65.57; H, 4.10; N, 14.80; S, 8.4.

EXAMPLE VII

To a solution of 6 g. of 4-amino-6-chloro-2-methylthiopyrimidine in 30 ml. of dry pyridine, there is added 6.5 g. of 4-toluenesulfonyl chloride. The reaction mixture is heated under reflux with stirring for two and one half hours, cooled and poured into 475 ml. of water. On standing a crystalline product is deposited which amounted to 6.0 g., M.P. 220–224° C. Recrystallization of this material affords 1-[2-methylthio-6-(4-tolylsulfonamido)pyrimidin-4-yl] pyridinium hydroxide, inner salt, M.P. 277–278° C.

*Analysis.*—Calc'd for $C_{17}H_{16}N_4O_2S_2$: C, 54.82; H, 4.33; N, 15.04; S, 17.22. Found: C, 54.83; H, 4.05; N, 15.14; S, 17.1.

In the same manner, the following compounds are prepared:

1 - [2-ethylthio-6-phenylsulfonamidopyrimidin-4-yl] - 4-propylpyridinium hydroxide, inner salt;
1 - [6 - (4-chlorophenylsulfonamido)-2-propylthiopyrimidin-4-yl]pyridinium hydroxide, inner salt;
3 - methyl-1-[2-methylthio-6-(4-tolysulfonamido)pyrimidin-4-yl]pyridinium hydroxide, inner salt; and
1 - [2-methylthio-6-(4-pentylsulfonamido)pyrimidin-4-yl] pyridinium hydroxide, inner salt.

EXAMPLE VIII

To a soluion of 6.0 g. of 4-amino-6-chloro-2-methylpyrimidine in 03 ml. of dry pyridine is added 6.5 g. of 4-toluenesulfonyl chloride. The reaction mixture is heated under reflux with stirring for four hours, cooled and poured into 500 ml. of water. On standing a crystalline product precipitates and is separated by filtration. Upon recrystallization from dimethylformamide is obtained 1-[2-methyl-6-(4-tolylsulfonamido)pyrimidin-4 - yl]pyridinium hydroxide, inner salt.

Similarly, by reacting 4-amino-6-chloro-2-propylpyrimidine with α-picoline and 4-chlorophenylsulfonyl chloride, there is obtained 1-[6-(4-chlorophenylsulfonamido)-2-propylpyrimidin-4-yl]-2 - methylpyridinium hydroxide, inner salt.

EXAMPLE IX

To a solution of 12.0 g. of 4-amino-6-chloro-2-ethylpyrimidine in 60 ml. of dry pyridine, there is added 13.0 g. of benzenesulfonyl chloride. The reaction mixture is heated under reflux with stirring for three hours, cooled and poured into 1000 ml. of water. On standing, a product is deposited which is separated by filtration and recrystallization from water to afford 1-[2-ethyl-6-phenylsulfonamidopyrimidin-4-yl]pyridinium hydroxide, inner salt.

EXAMPLE X

Employing the procedure of the prior examples to react an appropriate 4-amino-6-chloropyrimidine, a pyridine and an alkylsulfonyl chloride, the following pyridinium hydroxide, inner salts are produced:

1 - [2-butyl-6-(4-fluorophenylsulfonamido)pyrimidin-4-yl]pyridinium hydroxide, inner salt;
3 - ethyl-[2-methyl-6-(4-tolysulfonamido)pyrimidin-4-yl]pyridinium hydroxide, inner salt;
1 - [2-ethyl-6-phenylsulfonamidopyrimidin-4-yl]-3-ethyl-pyridinium hydroxide, inner salt; and
1 - [6-boromphenylsulfonamido-2-methylpyrimidin-4-yl]pyridinium hydroxide, inner salt.

What is claimed is:
1. A compound selected from the group consisting of those having the formula:

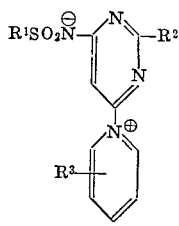

wherein $R^1$ is selected from the group consisting of phenyl, monohalophenyl and lower alkylphenyl; $R^2$ is lower alkyl, lower thioalkyl, phenyl, lower alkylphenyl, monohalophenyl and lower alkoxyphenyl and $R^3$ is selected from the group consisting of hydrogen and lower alkyl.

2. A compound as described in claim 1 which is: 1-[2-phenyl-6-(4-tolysulfonamido)pyrimidin-4-yl]pyridinium hydroxide, inner salt.

3. A compound as described in claim 1 which is: 1-[2-methylthio-6-(4-tolysulfonamido)pyrimidin-4-yl]pyridinium hydroxide, inner salt.

4. A compound as described in claim 1 which is: 1-[6-(4-chlorophenylsulfonamido)-2-phenylpyrimidin-4-yl]pyridinium hydroxide, inner salt.

5. A compound as described in claim 1 which is: 1-[6-phenylsulfonamido-2-phenylpyrimidin-4-yl]pyridinium hydroxide, inner salt.

6. A compound as described in claim 1 which is: 1-[2-methyl-6-(4-tolysulfonamido)pyrimidin-4-yl]pyridinium hydroxide, inner salt.

7. A compound as described in claim 1 which is: 1-[2-ethyl-6-phenylsulfonamidopyrimidin-4-yl]pyridinium hydroxide, inner salt.

8. A compound as described in claim 1 which is: 1-[2-(4-chlorophenyl)-6-phenylsulfonamidopyrimidin-4-yl]pyridinium hydroxide, inner salt.

9. A compound as described in claim 1 which is: 2-methyl-1-[2-phenyl-6-(3-tolysulfonamido)pyrimidin-4-yl]pyridinium hydroxide, inner salt.

10. A process for the production of a compound having the formula:

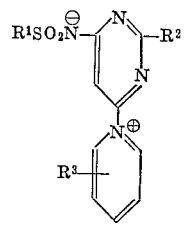

wherein $R^1$ is selected from the group consisting of phenyl, monohalophenyl and lower alkylphenyl; $R^2$ is lower alkyl, lower thioalkyl, phenyl, lower alkylphenyl, monohalophenyl and lower alkoxyphenyl and $R^3$ is selected from the group consisting of hydrogen and lower alkyl; which comprises heating a mixture of a 4-amino-6-chloropyrimidine of the formula:

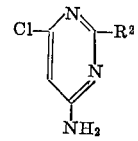

wherein $R^2$ is defined as above, with an excess of pyridine of the formula:

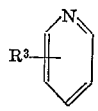

wherein $R^3$ is defined as above, and a sulfonyl chloride of the formula:

$R_1SO_2Cl$

References Cited
UNITED STATES PATENTS
2,553,994  5/1951  Wuest _____ 260—294.8
2,931,813  4/1960  Kalm _____ 260—256.5

ALEX MAZEL, *Primary Examiner.*
R. J. GALLAGHER, *Assistant Examiner.*

U.S. Cl. X.R.
260—256.4; 424—251